United States Patent [19]
Kaneda

[11] Patent Number: 5,224,767
[45] Date of Patent: Jul. 6, 1993

[54] HYDRAULIC ACTUATOR FOR SKID CONTROL SYSTEM

[75] Inventor: Ichiro Kaneda, Atsugi, Japan

[73] Assignee: Atsugi Unisia Corporation, Atsugi, Japan

[21] Appl. No.: 722,843

[22] Filed: Jun. 28, 1991

[30] Foreign Application Priority Data

Jun. 28, 1990 [JP] Japan .................. 2-68794[U]

[51] Int. Cl.⁵ .............................. B60D 13/68
[52] U.S. Cl. ................................ 303/119.2
[58] Field of Search ......... 303/3, 15, 119 R, 119 SU, 303/116 R

[56] References Cited

U.S. PATENT DOCUMENTS

| | | | |
|---|---|---|---|
| 3,989,063 | 11/1976 | Brouwers et al. | 303/119 SV |
| 4,526,203 | 7/1985 | Lieber | 303/119 SV |
| 4,619,289 | 10/1986 | Tsuru et al. | 303/119 SV |
| 4,821,770 | 4/1989 | Parrott et al. | 303/119 SV |
| 5,066,075 | 11/1991 | Kaneda et al. | 303/119 R |

FOREIGN PATENT DOCUMENTS 49-26220  7/1974  Japan.
2-87667  7/1990  Japan.

*Primary Examiner*—Robert J. Oberleitner
*Assistant Examiner*—Lee W. Young
*Attorney, Agent, or Firm*—Bachman & LaPointe

[57] ABSTRACT

A hydraulic actuator for a skid control hydraulic brake system comprises a casing having a master cylinder side port and a cover having a wheey cylinder side port. The wheel cylinder side port is positioned generally between an inflow solenoid valve and an outflow solenoid valve. The inflow and outflow solenoid valves define on their upper clearances, respectively. A three dimensionally curved pipe is embedded, by molding, in the cover to conduct fluid from the clearances to the wheel cylinder side port.

6 Claims, 4 Drawing Sheets 5,224,767

HYDRAULIC ACTUATOR FOR SKID CONTROL SYSTEM

BACKGROUND OF THE INVENTION

The present invention relates to an hydraulic actuator of a skid control for a hydraulic brake system.

Japanese Utility Model Application First (unexamined) Publication No. 2-87667 (publication date: Jul. 11, 1990), which is not prior art under 35 U.S.C. 102(d), discloses a hydraulic actuator serving as a major component of a skid control for a hydraulic brake system. This hydraulic actuator is provided with an air bleeder. Thus, it is necessary to cut a hole for installation of the air bleeder after molding a casing and a cover for the casing.

An object of the present invention is to improve a hydraulic actuator of the above kind such that it is no more necessary to cut any installation hole for an air bleeder.

SUMMARY OF THE INVENTION

According to the invention, there is provided a hydraulic actuator for a hydraulic brake system including a master cylinder and a wheel cylinder, the hydraulic actuator comprising:

a casing having a master cylinder side port for fluid connection with the master cylinder;

a cover for said casing, said cover having a wheel cylinder side port for fluid connection with the wheel cylinder;

an inflow solenoid valve mounted in said casing and fluidly disposed between said master cylinder side port and said wheel cylinder side port;

an outflow solenoid valve mounted in said casing; and a pipe means embedded in said cover for conducting air within said inflow and outflow solenoid valves to said wheel cylinder side port.

DETAILED DESCRIPTION OF THE INVENTION

Figure 1:
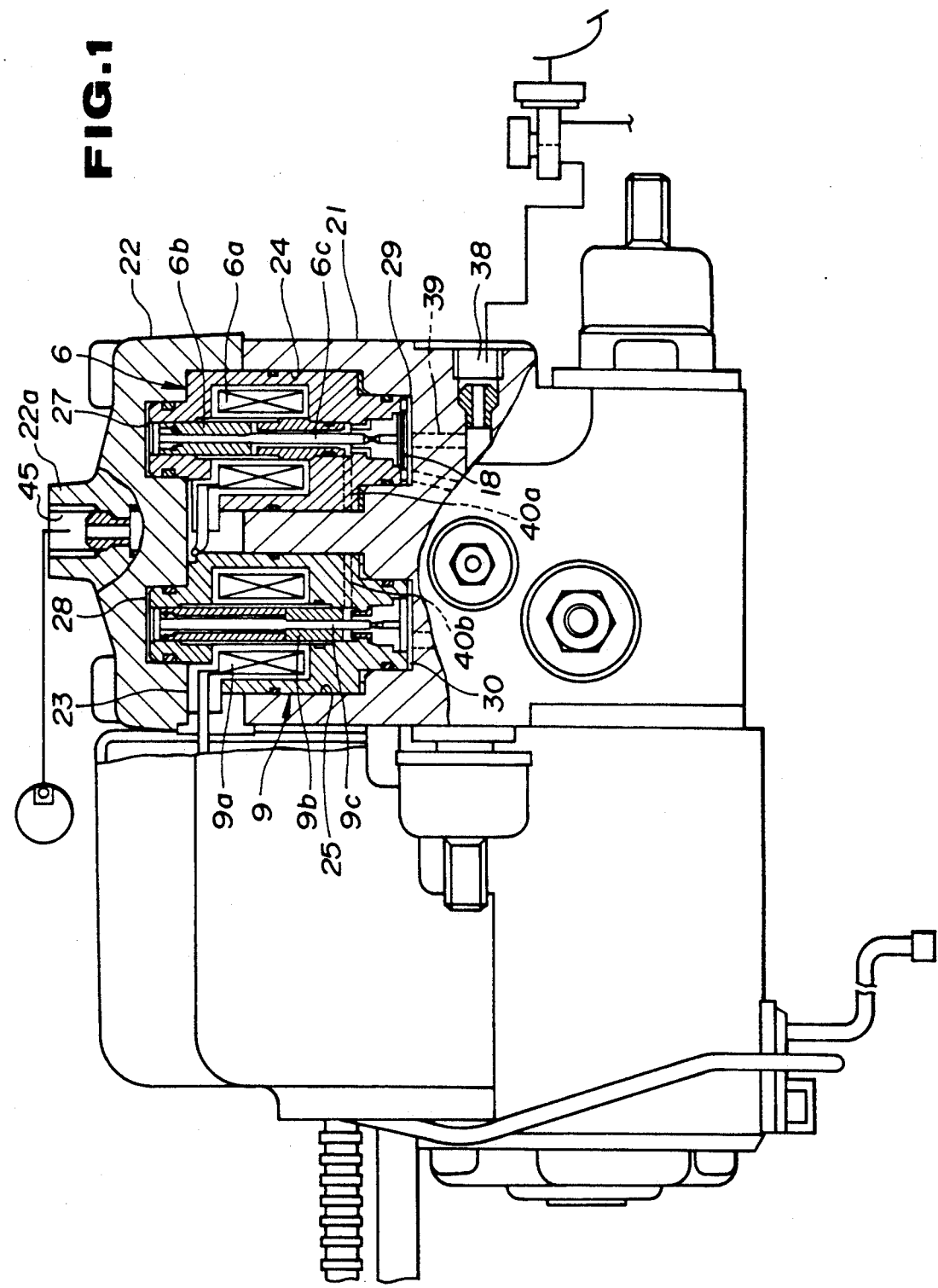
FIG. 1 is a side elevation partly sectioned of an embodiment of a hydraulic actuator according to the present invention.
Figure 2:
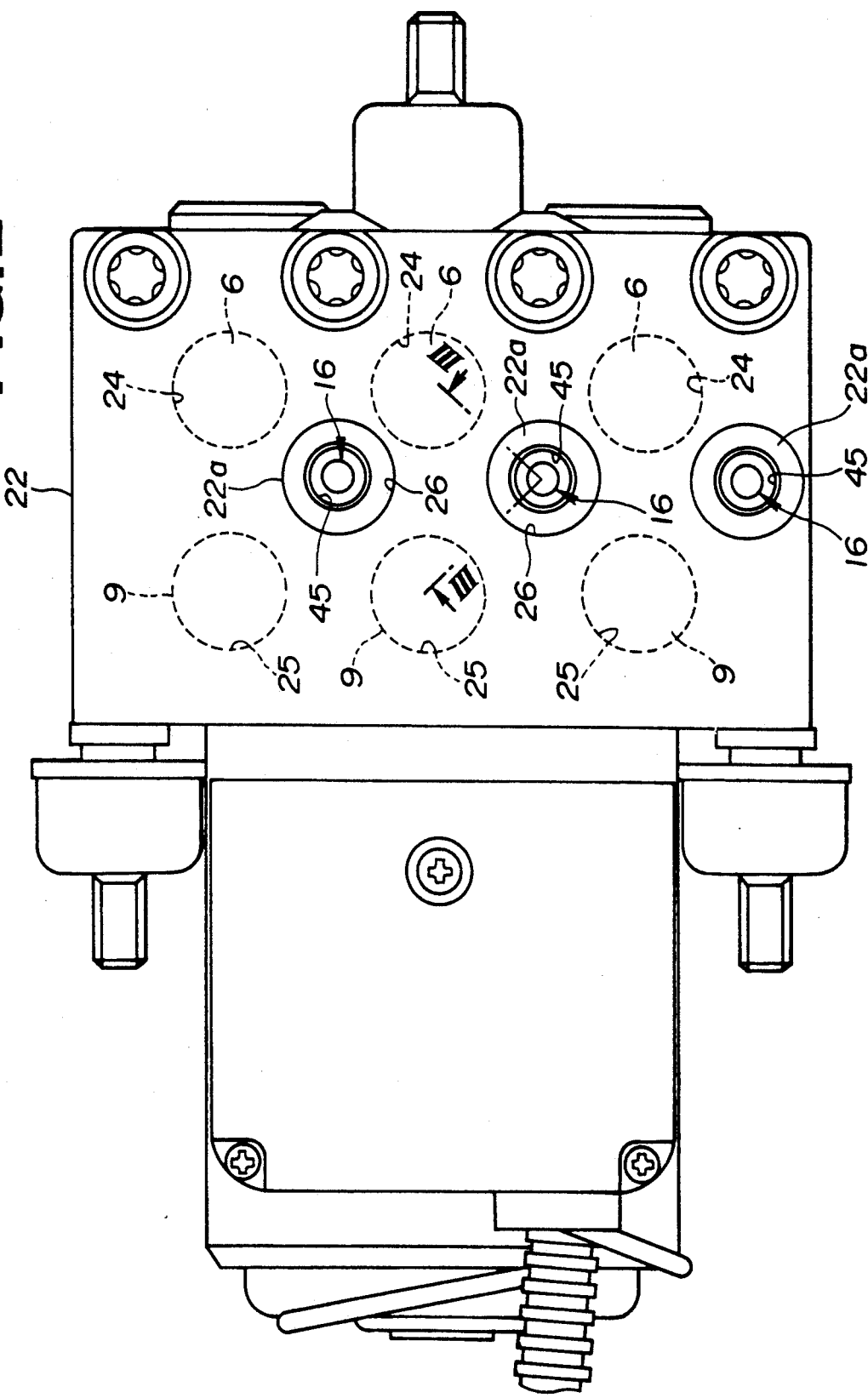
FIG. 2 is a top plan view of the hydraulic actuator shown in FIG. 1.
Figure 3:
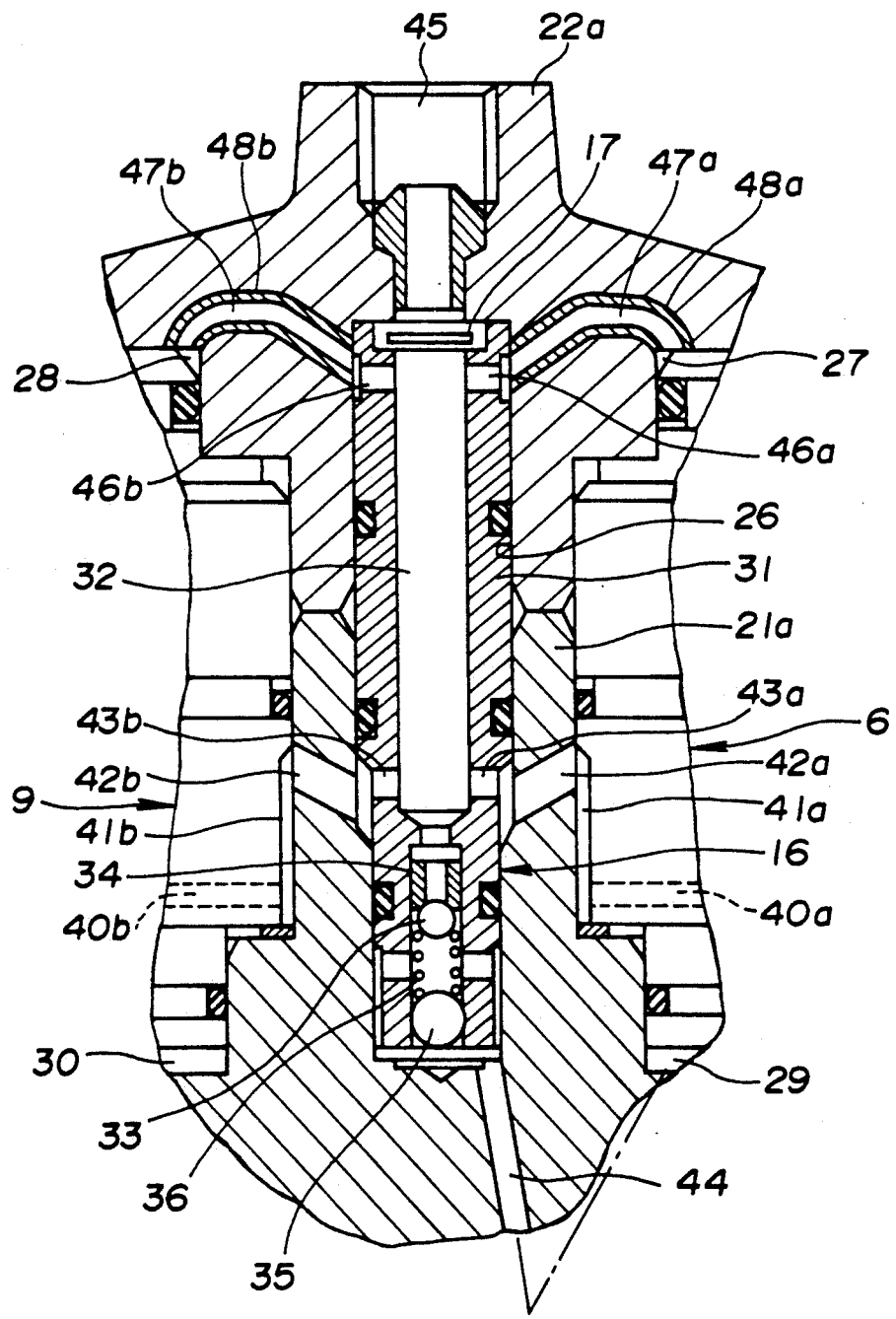
FIG. 3 is an enlarged fragmentary section through the line III—III of FIG. 2.

Referring to FIGS. 1 to 3, there is shown a hydraulic actuator of a skid control for a hydraulic brake system including a master cylinder, front wheel cylinders for front wheels and rear wheel cylinders for rear wheels. The hydraulic actuator has a casing 21 of an aluminum alloy, and a cover 22 of an aluminium alloy closing an upper end portion of the casing 21 in a liquid tight manner with grommet 23 interposed therebetween. The casing 21 and cover 22 cooperate with each other to define three pairs of solenoid valve accommodating bores 24 and 25 which are arranged in a manner as indicated in broken lines in FIG. 2. Between the bores 24 and 25 of each pair is disposed a return check valve accommodating bore 26.

As shown in FIG. 1, an inflow solenoid valve 6 and an outflow solenoid valve 9 are received in the bores 24 and 25, respectively, while as shown in FIG. 3, a return check valve 16 is received in the bore 26.

In FIG. 1, the solenoid valves 6 and 9 comprise coils 6a and 9a, armatures 6b and 9b, and valve plungers 6c and 9c, respectively. The inflow solenoid valve 6 is of the normally open two position type, while the outflow solenoid valve 9 is of the normally close two position type. The inflow and outflow solenoid valves 6 and 9 define within their bores 24 and 25 upper or first clearances 27 and 28, respectively, and lower or second clearances 29 and 30, respectively.

In FIG. 3, the return check valve 16 comprises a stepped cylindrical holder 31 received in a press fit manner by the bore 26. This holder 31 defines a valve passage 32. A ball valve 33 and a mating valve seal 34 are disposed in the holder 31 and cooperate with each other to open or close a lower axial end of the valve passage 32. A spherical spring retainer 35 is also disposed in the holder 31. A spring 36 is operatively disposed between the spherical spring retainer 35 and the ball valve 33 to bias the ball valve 33 to a closed position thereof where the ball valve 33 seats on the valve seat 34. With this ball valve 33, no hydraulic fluid can flow from a return passage 44 to the valve passage 32, no hydraulic fluid can flow from the valve passage 32 to the return passage as long as pressurized hydraulic fluid is supplied to the return passage by the master cylinder of the brake system. However, when the hydraulic pressure in the return passage drops owing to release of a brake pedal of the master cylinder, the pressurized hydraulic fluid can open the ball valve 33 against the spring 36 to flow into the return passage 44. The holder 31 has a filter 17 disposed on an upper end of the valve passage 32.

Returning back to FIG. 1, the casing 21 has a master cylinder side port 38 for fluid connection with the master cylinder of the brake system. It is formed with a passage hole 39 establishing fluid communication between the master cylinder side port 38 and the lower clearance 29 below the inflow solenoid valve 6. When the inflow solenoid valve 6 is open, the lower clearance 29 is in fluid communication via a filter 18 with a lateral passage 40a of the solenoid valve 6. As best seen in FIG. 3, this lateral passage 40a communicates with a groove 41a which in turn communicates with an inclined passage 42a of the casing 21. The inclined passage 42a communicates via a radial port 43a of the holder with the valve passage 32. Although not specifically explained, the lower clearance 29 is in fluid communication with the upper clearance 27 through an internal fluid connection established when the inflow control valve 6 is open. Similarly, the lower clearance 30 below the outflow solenoid valve 9 communicates with the valve passage 32 via a lateral passage 40b, a groove 41b, an inclined passage 42b and a radial port 43b when the outflow solenoid valve 9 is opened, and the lower clearance 30 becomes in fluid communication with the upper clearance 28 through an internal fluid connection established when the outflow control valve 9 is opened.

The cover 22 is formed by molding process of aluminium alloy, and has a cylindrical boss portion 22a above each of the check valve accommodating bores 26. Each boss portion 22a is formed with a wheel cylinder side port 45 for fluid connection with the wheel cylinder of the brake system. As best seen in FIG. 3, the wheel cylinder side port 45 is in an axial alignment with the valve passage 32 and in fluid communication with the upper end of the valve passage 32. The upper clearance 27 communicates with the upper end portion of the valve passage 32 through a passage 47a defined by a pipe portion 48a embedded in the cover 22 during the molding process and a radial port 46a of the holder 31, while the upper clearance 28 communicates with the upper end portion of the valve passage 32 through a passage 47b defined by a pipe portion 48b embedded in the cover 22 during the molding process and a radial port 46b of the holder 31.

Figure 4:
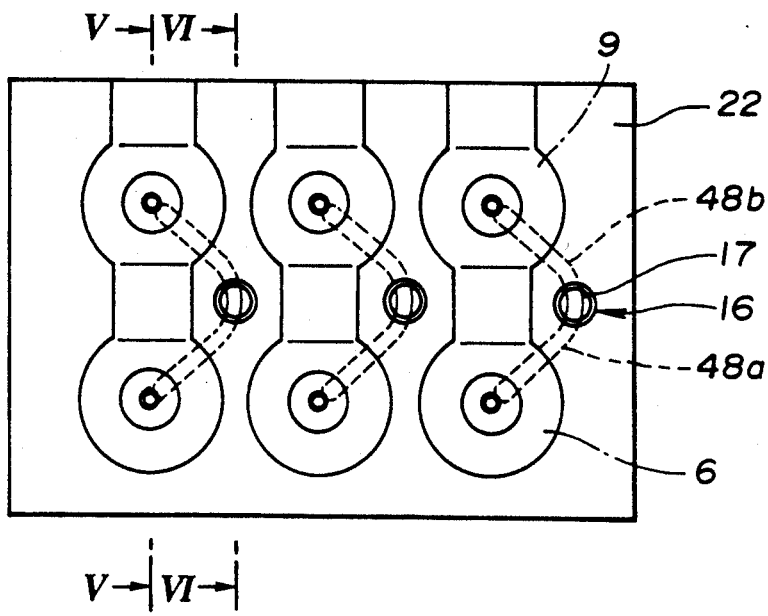
FIG. 4 is a top plan view of a mold body of a cover.
Figure 6:
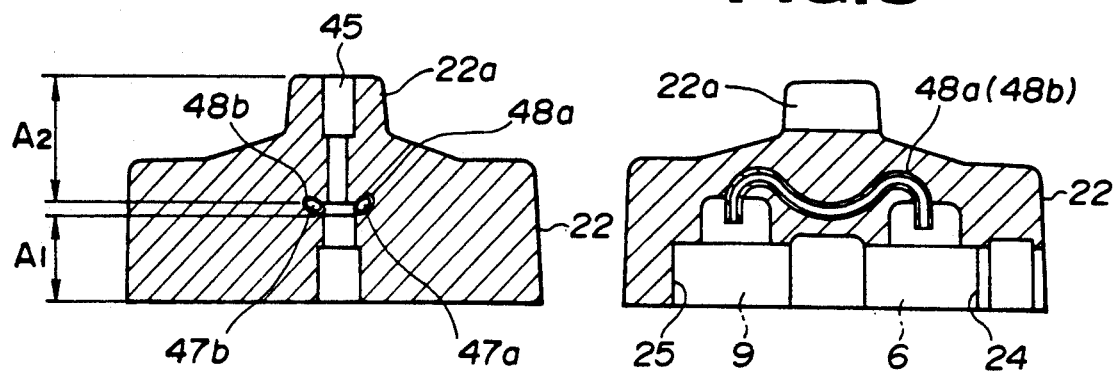
FIG. 6 is a section through the line VI—VI of FIG. 4.
Figure 5:
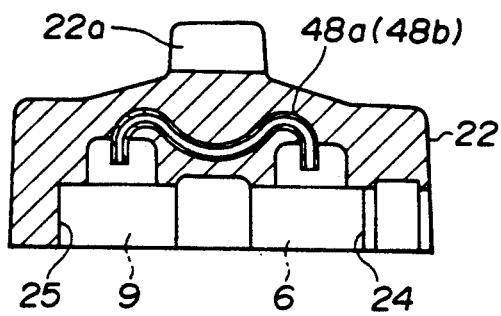
FIG. 5 is a section through the line V—V of FIG. 4.

The manner of embedding the pipe portions 48a and 48b in the cover 22 is explained below in connection with FIGS. 4, 5 and 6.

Three pipes of steel having a melting point temperature higher than that of aluminimum alloy are prepared. Each of them is three dimensionally curved such that it is generally M in its front elevational profile (see FIG. 5), but V in its top plan profile (see FIG. 4). These pipes are embedded in the usual molding process. In order to for increased accuracy in dimensions $A_1$ and $A_2$ (see FIG. 6), positioning pins are projected from upper and lower molds.

The principle of operation of this embodiment is explained below.

During usual braking, the inflow solenoid valve 6 is open and the outflow valve 9 closed. Under this condition, as the brake pedal is depressed, it moves a piston, not shown, within the master cylinder, forcing hydraulic fluid into the master cylinder side port 38. Then, hydraulic fluid is forced into the lower clearance 29 via the passage 39. As best seen in FIG. 3, a portion of hydraulic fluid is forced into the lateral passage 40a, groove 41a, inclined passage 42a, radial port 43a and the valve passage 32. Hydraulic fluid is forced into the wheel cylinder side port 45 along the valve passage 32. A portion of hydraulic fluid is forced into the radial port 43b, inclined passage 42b, groove 41b, lateral passage 40b, internal connection through the outflow solenoid valve 9 and the upper clearance 28. Hydraulic fluid is thereafter forced into the passage 47b defined by the pipe 48b, radial port 46b, upper end portion of the valve passage 32 and wheel cylinder side port 45. The remaining portion of hydraulic fluid in the lower clearance 29 is forced through the internal connection of the inflow solenoid valve 6 into the upper clearance 27. Hydraulic fluid is thereafter forced into the passage 47a defined by the pipe 48a, radial port 46a, upper end portion of the valve passage 32 and wheel cylinder side port 45. From the wheel cylinder side port 45, hydraulic fluid is forced into the wheel cylinder through an external pipe. An air bleeder is provided on this external pipe leading to each wheel cylinder, air contained in each of three separated flows within the hydraulic actuator is separated from hydraulic fluid by the air bleeder and escaped into the open air.

Hydraulic fluid passes through the same three flow paths as explained above during pressure increase mode in skid control.

When the brake pedal is released, hydraulic fluid from the wheel cylinder urges the ball valve 33 to enter the passage 44, then returning to the master cylinder.

The detailed operation of the brake system using the inflow and outflow solenoid valves is explained in co-pending U.S. application Ser. No. 07/719,414, filed on Jun. 24, 1991, (our reference No. US91ATS/130) entitled "HYDRAULIC BRAKE SYSTEM" claiming priority on Japanese Utility Model Application No. unidentified now filed in Japan on Jun. 22, 1990. This copending United States Patent Application is hereby incorporated by reference in its entirety.

Figure 7:
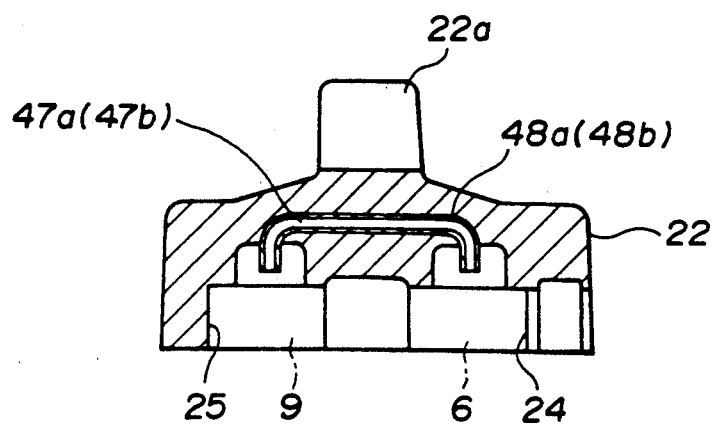
FIG. 7 is a similar view to FIG. 5 illustrating a modification of a cover.

FIG. 7 shows a modification of a pipe. As will be seen from comparing FIG. 7 with FIG. 5, the profile is not M but the top portion is straight. In this case, a boss portion 22a becomes higher than the boss portion 22a in the case of FIG. 5.

What is claimed is:

1. In a hydraulic brake system:
   a master cylinder;
   a wheel cylinder;
   a casing having a master cylinder side port fluidly connecting with said master cylinder;
   a cover mounted to said casing, said cover having a wheel cylinder side port fluidly connecting with said wheel cylinder;
   an inflow solenoid valve mounted within said casing and fluidly disposed between said master cylinder side port and said wheel cylinder side port;
   an outflow solenoid valve mounted in said casing and fluidly disposed between said master cylinder side port and said wheel cylinder side port;
   said inflow solenoid valve and said outflow solenoid valve being arranged in parallel between said master cylinder side port and said wheel cylinder side port; and
   a pipe means for conducting air within said inflow and outflow solenoid valves to said wheel cylinder side port, said pipe means being embedded in said cover and having a first pipe extending between said wheel cylinder side port and said inflow solenoid valve to establish fluid communication therebetween and a second pipe extending between said wheel cylinder side port and said outflow solenoid valve to establish fluid communication therebetween.

2. A hydraulic brake system as claimed in claim 1, wherein said casing has mounted therein a return check valve between said inflow and outflow solenoid valves.

3. A hydraulic brake system as claimed in claim 2, wherein said return check valve has means for defining a valve passage having one end portion communicating with said wheel cylinder side port and, said first pipe portion and said second pipe portion.

4. A hydraulic brake system as claimed in claim 3, wherein said valve passage has an opposite end portion fluidly disposed between said inflow and outflow solenoid valves.

5. A hydraulic brake system as claimed in claim 4, wherein said casing is formed with a return passage communicating with said master cylinder side port, and wherein said return check valve has a ball valve element fluidly disposed between said opposite end portion of said valve passage and said return passage.

6. A hydraulic brake system as claimed in claim 5, wherein said return check valve has a filter disposed between said wheel cylinder side port and said first and second portions.

* * * * *